United States Patent [19]

Collette et al.

[11] Patent Number: 4,847,129
[45] Date of Patent: Jul. 11, 1989

[54] MULTILAYER PREFORM FOR HOT FILL CONTAINERS

[75] Inventors: Wayne N. Collette, Merrimack; David P. Piccioli, Auburn; Suppayan M. Krishnakumar, Nashua, all of N.H.

[73] Assignee: Continental PET Technologies, Inc., Norwalk, Conn.

[21] Appl. No.: 245,376

[22] Filed: Sep. 16, 1988

[51] Int. Cl.[4] .............................. B65D 23/00
[52] U.S. Cl. ............................ 428/35.7; 428/36.7; 428/212; 428/213; 428/480; 428/483; 428/542.8; 215/1 C; 220/453; 264/255
[58] Field of Search ............ 428/35.7, 36.7, 542.8, 428/480, 483, 212, 213; 220/453; 215/1 C; 264/255

[56] References Cited

U.S. PATENT DOCUMENTS

| 4,550,043 | 10/1985 | Beck | 428/412 |
| 4,609,516 | 9/1986 | Krishnakumar et al. | 264/255 |
| 4,743,479 | 5/1988 | Nakamura et al. | 428/36.7 |
| 4,781,954 | 11/1988 | Krishnakumar et al. | 428/542.8 |

Primary Examiner—Ellis P. Robinson
Assistant Examiner—James J. Seidleck
Attorney, Agent, or Firm—Charles E. Brown; Paul Shapiro; Charles A. Brown

[57] ABSTRACT

This relates to the formation of a preform for a container which is formed primarily of PET and like saturated polyesters which are to be utilized in the packaging of a hot fill liquid and like product, particularly a container wherein a metal closure is to be utilized. The preform is of a laminated construction with the body of the preform being of a five layer construction and the neck finish portion being primarily of a three layer construction including outer layers of PET or like saturated polyester and a core formed of a high Tg polymer. The same high Tg polymer would be in the form of thin layers in the body of the preform between inner and outer layers and a core.

11 Claims, 1 Drawing Sheet

MULTILAYER PREFORM FOR HOT FILL CONTAINERS

This invention relates in general to new and useful improvements in blow molded plastic containers, and more particularly to a preform particularly constructed for forming a blow molded container particularly adapted to receive a hot fill product and capable of being closed by a metal closure.

Conventional containers, particularly those formed from injection molded preforms, have a neck finish which remains in its injection molded state and which is unoriented. As a result, such a neck finish for polyethylene terephythalate (PET) has a very low thermal stability when compared to the biaxially oriented strain crystallized bottle side walls.

It is well known to utilize metal closures of the lug or roll on type in the packaging industry to close and seal glass and certain plastic containers after the containers have received a hot fill bottle.

On the other hand, polymeric bottles and jars are frequently the package of choice of both marketers and consumers due to the inherent light weight of such containers and the safety advantages of plastic over glass containers.

Polyethylene terephythalate (PET) containers are frequently preferred in hot fill food and juice applications over other polymers (olefins, acrylonitrile, etc.) due to its superior balance of clarity, economics and physical performance. However, to date, the use of amorphous uncrystallized PET molded finishes has been restricted to polymerics (typically polypropylene) closures which apply little or no unbalanced force to the relatively low (160° F.) Tg PET finish.

With the relatively high product fill temperature (175°-195° F.) versus the amorphous PET distortion temperature, it is impossible to utilize rigid metal closures which yield high finish loading forces during the closing operation. Such forces result in the deformation of the PET finish and package leakers.

Unfortunately, the barrier properties of polymeric closures are substantially less than their metal counterparts. Polypropylene (PP), for example, has an oxygen permeation level of over one hundred times that of PET. Many hot fill juice products, such as grapefruit and non-preserved juices do not exhibit adequate PET package shelf life with PP closures. In such cases, metal closures are required to permit the use of the desired PET container.

In an effort to utilize metal closures on PET containers which have been blow molded from injection molded preforms, there has been developed a method of crystallizing the neck finish region above the capping ring on PET containers. This process raises the percent crystallinity of the injection molded finish from less than five percent (as molded) to 40 or 50 percent (after crystallization). The crystallization in turn raises the effective Tg of the finish region and permits the use of metal closures. Although technically functional, except for the shrinkage and distortion of the threads due to the high temperature involved in crystallization, this technique increases the PET container cost due to the additional manufacturing step.

Krishnakumar et al U.S. Pat. No. 4,609,516 granted Sept. 2, 1986 teaches that a preform may be injection molded so as to have a laminated wall construction. Such a wall construction typically is of a five layer construction including inner and outer PET layers, inner and outer barrier layers, and a PET core. Further, in FIG. 9 of that patent, it is taught that the barrier layers need not extend into the neck finish. Thus, the PET outer layers are reinforced by the core layer.

Beck U.S. Pat. No. 4,550,043 granted Oct. 29, 1985 contains a disclosure similar to that of the Krishnakumar et al patent, but additionally specifically discloses that the core may be formed of a thermoplastic having high temperature thermal stability. However, in accordance with the Beck disclosure, the thermoplastic having a high temperature stability forms a major portion of the preform.

In accordance with this invention, there is proposed a novel solution to the finish distortion problem by the use of the sequential co-injection process disclosed in the Krishnakumar et al and Beck patents wherein the neck finish portion is substantially of a three layer construction and the remainder of the preform and the resultant container is of a five layer construction with the high temperature material forming a thick core of the three layer structure and two thinner layers of the five layer structure. Most specifically, the high temperature material will be concentrated in the neck finish of the preform.

In accordance with this proposal, the preform will primarily be of a two material construction with PET constituting between 90 and 95% of the material of the preform.

With the above and other objects in view that will hereinafter appear, the nature of the invention will be more clearly understood by reference to the following detailed description, the appended claims, and the several views illustrated in the accompanying drawings.

BRIEF DESCRIPTION OF DRAWINGS

Referring now to FIG. 1, it will be seen that there is illustrated a preform 10 having a typical configuration for forming, for example, a bottle. The preform 10 includes an upper neck finish 12 including threads 14. The neck finish 12 generally terminates in a capping ring 16. Below the capping ring 16, the preform 10 has a shoulder forming portion 18 of a gradually increasing wall thickness which, in turn, terminates in a body portion 20 from which the body of the container is formed.

Figure 3:
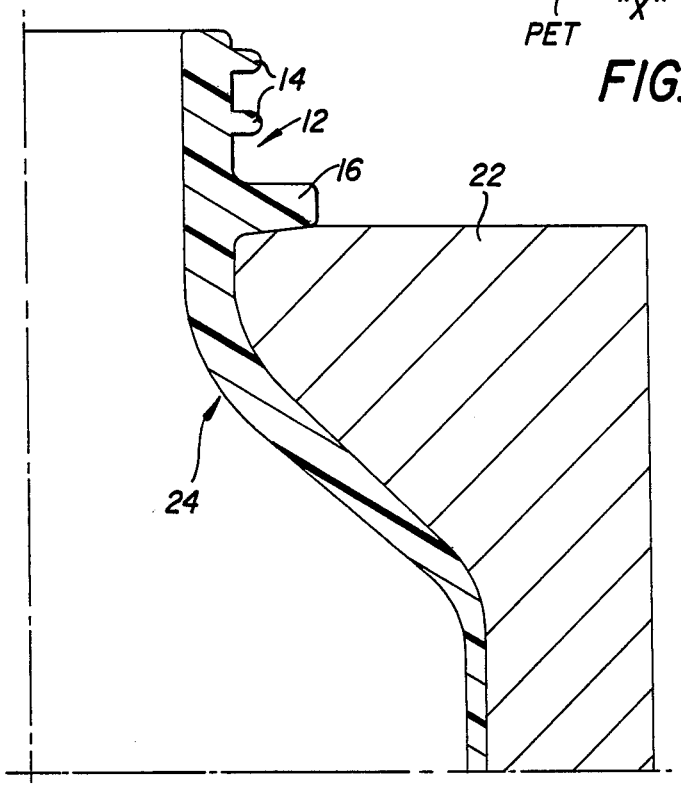
FIG. 3 is an enlarged fragmentary sectional view of the upper part of the preform of FIG. 1 blow molded to define an upper part of the container.
Figure 2:
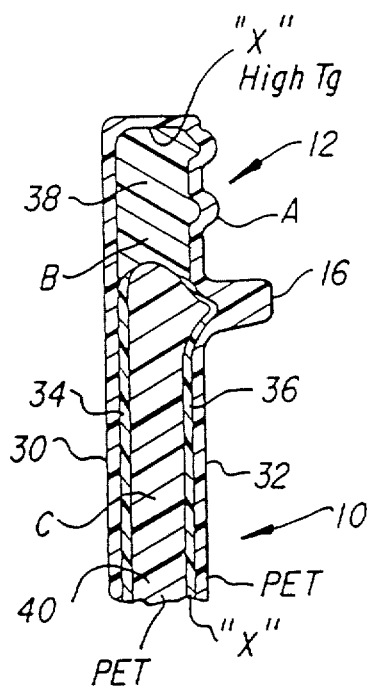

When the preform 10 is placed in a conventional blow mold 22 and blow molded into a container in a conventional manner, the neck finish 12, including the threads 14 and the capping ring 16 are not heated. On the other hand, starting generally at or slightly below the capping ring 16, the preform is heated so that when a blowing gas is applied internally of the preform, the preform will stretch both axially and in the hoop direction to assume the shape of the interior of the blow mold 22, as is clearly shown in FIG. 3. Such a container is generally identified by the numeral 24.

Figure 1:
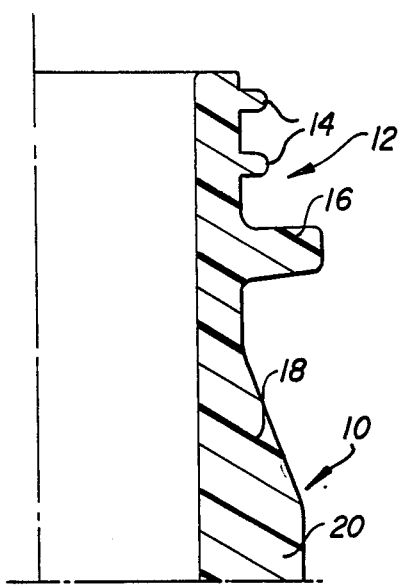
FIG. 1 is a half section taken through an upper portion of a preform formed in accordance with this invention.
Figure 2:
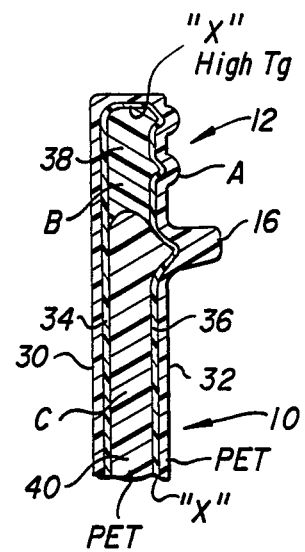
FIG. 2 is an enlarged detailed sectional view of the upper part of the preform of FIG. 1 and shows the relationship of the various layers of the preform.

This invention relates specifically to the constructional details of the preform 10, which constructional details are illustrated in FIG. 2. In accordance with the aforementioned Krishnakumar et al and Beck patents, a limited amount of a material A is injected into a preform mold cavity to define a thin inner layer 30 and a like thin outer layer 32 with the material A substantially entirely forming the capping ring 16. Next, a material B is injected into the preform mold cavity in a quantity to provide a thin inner intermediate layer 34 and a thin outer intermediate layer 36. The quantity of the material B injected into the preform injection mold is sufficient to provide a core 38 which defines a major portion of the neck finish 12 above the capping ring 16. Finally, a material C is injected into the preform mold cavity with the material C defining a core 40 filling the space between the layers 34, 36 throughout the remainder of the preform. In the preferred embodiment of the preform 10, the material C will terminate generally at the base of the neck finish 12 immediately above the capping ring 16.

In the injection molding of the preform 10, the first material A would be a metered quantity of PET, the second material B would be a limited quantity of high Tg polymer, and the material C would directed into the injection mold cavity directly from the extruder and would preferably be in the form of PET although it not necessarily would be the same PET as the material A.

Most specifically, based upon the present technology the high Tg polymer would be selected from the following: polyethylenenapthalene, polycarbonate, polyarylate or other commercially available polymers with Tg's in excess of 90° C. On the other hand, it must be appreciated that the polymer field is a highly developing one with the cost of materials rapidly changing so that other high Tg polymers which are either too costly at the present or have not been sufficiently developed at this time may be utilized.

It is also to be understood that the thicknesses of the various layers of the materials forming the preform 10 will vary depending on the size of the preform 10 and the container 24 which is to be blow molded therefrom. A typical preform 10 for a two litre container will have in the neck finish 12 an overall thickness of 0.100" with the core 38 having a thickness of 60-80 mils. On the other hand, in the body forming portion 20 of the preform 10, the overall thickness will be 0.200" with the layers 30, 32 having a thickness on the order of 0.045", the layers 34, 36 having a thickness on the order of 0.005" and the core 40 having a thickness on the order of 0.100".

In addition, the overall volumes of the materials A and C would constitute 90-95% of the preform 10 while the material B will constitute 5-10% of the volume of the preform.

It is also to be understood that the high Tg polymer would vary depending whether adhesion between material B and materials A and C is required. If adhesion is required, then the high Tg polymer would a co-polyester while if adhesion is not required, then the high Tg polymer could be one having a melt processing temperature in a range of 400°-600° F.

At this time it is pointed out that the thin layers 34, 36 of the high Tg polymer in the resultant container body would also provide additional thermal performance of the container walls versus that obtained with a preform formed solely by injection molding of PET.

Although only a preferred embodiment of the preform construction has been specifically illustrated and described herein, it is to be understood that minor variations may be made in the preform construction without departing from the spirit and scope of the invention as defined by the appended claims.

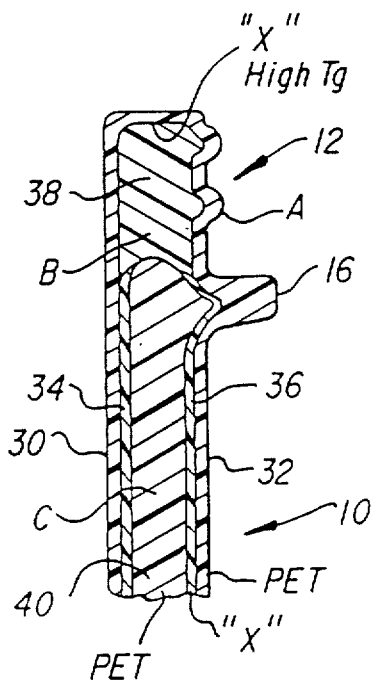

We claim:

1. A preform for forming a blow molded container particularly adapted to receive a hot fill product and be closed by a screw threaded closure, said preform having a molded neck finish including external threads for receiving a closure, said preform being of a laminated construction and including at least five layers below said neck finish and only three layers in the area of said threads; said five layers including inner and outer layers, inner and outer intermediate layers, and a core layer; said three layers including said inner and outer layers and a core layer, said core layer of said three layers forming a major portion of the cross section of said neck finish in the area of said threads, said core layer of said three layers being formed of a plastic having a higher Tg than said outer and inner layers, and said inner and outer intermediate layers being formed of the same material as said core layer of said three layers.

2. A preform according to claim 1 wherein said high Tg plastic is a polymer with a Tg in excess of 80° C.

3. A preform according to claim 1 wherein said inner and outer layers are formed of a saturated polyester.

4. A preform according to claim 1 wherein the Tg of the material of said inner and outer layers is in the range of 155°-165° F. and the Tg of said core of said three layers is in the range of 179°-210° F.

5. A preform according to claim 1 wherein the high Tg plastic constitutes 5-10% of the volume of said preform.

6. A preform according to claim 1 wherein in said three layers said high Tg layer constitutes from 50 to 90% of the thickness of said three layers.

7. A preform according to claim 1 wherein said inner and outer layers are formed of PET.

8. A preform according to claim 1 wherein said inner and outer layers are formed of PET which is a 0-5% copolymer having an IV ranging from 0.70 to 0.86.

9. A preform according to claim 1 wherein said core layer of said five layers is formed of the same material as said inner and outer layers.

10. A preform according to claim 1 wherein said preform is formed of only two materials.

11. A blow molded container formed from the preform of claim 1.

* * * * *

UNITED STATES PATENT AND TRADEMARK OFFICE
CERTIFICATE OF CORRECTION

PATENT NO. : 4,847,129

DATED : July 11, 1989

INVENTOR(S) : Wayne N. Collette et al

Page 1 of 3

It is certified that error appears in the above-identified patent and that said Letters Patent is hereby corrected as shown below:

The title page should be deleted to appear as per attached title page. Figure 2 should be deleted to be replaced with figure 2 as shown on the attached sheet.

Signed and Sealed this

Twentieth Day of March, 1990

*Attest:*

JEFFREY M. SAMUELS

*Attesting Officer*

*Acting Commissioner of Patents and Trademarks*

United States Patent [19]
Collette et al.

[11] Patent Number: 4,847,129
[45] Date of Patent: Jul. 11, 1989

[54] MULTILAYER PREFORM FOR HOT FILL CONTAINERS

[75] Inventors: Wayne N. Collette, Merrimack; David P. Piccioli, Auburn; Suppayan M. Krishnakumar, Nashua, all of N.H.

[73] Assignee: Continental PET Technologies, Inc., Norwalk, Conn.

[21] Appl. No.: 245,376

[22] Filed: Sep. 16, 1988

[51] Int. Cl.⁴ .................................................. B65D 23/00
[52] U.S. Cl. ........................... 428/35.7; 428/36.7; 428/212; 428/213; 428/480; 428/483; 428/542.8; 215/1 C; 220/453; 264/255
[58] Field of Search ............ 428/35.7, 36.7, 542.8, 428/480, 483, 212, 213; 220/453; 215/1 C; 264/255

[56] References Cited
U.S. PATENT DOCUMENTS

| | | | |
|---|---|---|---|
| 4,550,043 | 10/1985 | Beck | 428/412 |
| 4,609,516 | 9/1986 | Krishnakumar et al. | 264/255 |
| 4,743,479 | 5/1988 | Nakamura et al. | 428/36.7 |
| 4,781,954 | 11/1988 | Krishnakumar et al. | 428/542.8 |

Primary Examiner—Ellis P. Robinson
Assistant Examiner—James J. Seidleck
Attorney, Agent, or Firm—Charles E. Brown; Paul Shapiro; Charles A. Brown

[57] ABSTRACT

This relates to the formation of a preform for a container which is formed primarily of PET and like saturated polyesters which are to be utilized in the packaging of a hot fill liquid and like product, particularly a container wherein a metal closure is to be utilized. The preform is of a laminated construction with the body of the preform being of a five layer construction and the neck finish portion being primarily of a three layer construction including outer layers of PET or like saturated polyester and a core formed of a high Tg polymer. The same high Tg polymer would be in the form of thin layers in the body of the preform between inner and outer layers and a core.

11 Claims, 1 Drawing Sheet